(12) United States Patent
Hori et al.

(10) Patent No.: US 6,607,061 B2
(45) Date of Patent: Aug. 19, 2003

(54) ELECTROMAGNETIC CLUTCH CONTROL SYSTEM

(75) Inventors: Masakatsu Hori, Saitama (JP); Ryuji Asada, Saitama (JP); Akihiro Iwazaki, Saitama (JP); Shinji Ohkuma, Saitama (JP); Tatsuhiro Tomari, Saitama (JP); Kiyoshi Wakamatsu, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/060,056

(22) Filed: Jan. 31, 2002

(65) Prior Publication Data

US 2002/0134639 A1 Sep. 26, 2002

(30) Foreign Application Priority Data

Jan. 31, 2001  (JP) ........................................ 2001-023632

(51) Int. Cl.[7] ............................................. F16D 27/115
(52) U.S. Cl. ................................. 192/84.91; 192/84.93; 192/30 W
(58) Field of Search ........................... 192/84.91, 84.93, 192/84.96, 30 W

(56) References Cited

U.S. PATENT DOCUMENTS 4,340,133 A * 7/1982 Blersch .................... 192/30 W
2001/0035324 A1 * 11/2001 Okuma et al. ............. 192/48.2
2002/0163331 A1 * 11/2002 Sekiya et al. ............... 324/225

FOREIGN PATENT DOCUMENTS

JP  4-312217 A  * 11/1992
JP  2000-110851 A  * 4/2000

* cited by examiner

Primary Examiner—Richard M. Lorence
(74) Attorney, Agent, or Firm—Arent Fox Kintner Plotkin & Kahn, PLLC

(57) ABSTRACT

The engagement force of an electromagnetic clutch can be precisely controlled at a target engagement force by a simple structure even when an air gap of the electromagnetic clutch varies. An electromagnetic clutch control system includes magnetic flux density sensors, a target engagement force calculating device, a target magnetic flux density calculating device, and a feedback control device. The target magnetic flux density calculating device calculates a target magnetic flux density $\phi t$ based on a target engagement force Tt of electromagnetic clutches calculated by the target engagement force calculating device. The current supplied to the electromagnetic clutches is feedback controlled by the feedback control device so that an actual magnetic flux density $\phi$ detected by the magnetic flux density sensors agrees with the target magnetic flux density $\phi t$. This allows a target engagement force to be generated in the electromagnetic clutches by making the actual magnetic flux density agree precisely with the target magnetic flux density, even when the air gap varies due to wear of a frictional engagement member, etc. and the relationship between the actual magnetic flux density and the current supplied to the electromagnetic clutches changes.

3 Claims, 10 Drawing Sheets

EMBODIMENT

EMBODIMENT

A > 2B

A ≦ 2B

ELECTROMAGNETIC CLUTCH CONTROL SYSTEM

BACKGROUND OF THE INVENTION

1. Field of the Invention

The present invention relates to a control system for controlling the engagement force of an electromagnetic clutch at a target engagement force by controlling the current supplied to its coil.

2. Description of the Prior Art

There is a known technique for enhancing turning performance of a vehicle where an engine driving force can be distributed between right and left driven wheels via a driving force distribution system that includes two clutches, and the driving force distributed to the outer turning wheel is increased while the driving force distributed to the inner turning wheel is decreased so as to generate a yaw moment in the turning direction. In general, in an arrangement in which the two clutches are electromagnetic clutches, target magnetic flux densities are calculated from target engagement forces for the electromagnetic clutches. The target excitation currents that are supplied to coils of the electromagnetic clutches are calculated from the target magnetic flux densities, and feedback control is carried out so that actual excitation currents flowing through the coils agree with the target excitation currents.

In the above-mentioned arrangement, the target excitation current is calculated from the target magnetic flux density assuming that an air gap of the armature of each of the electromagnetic clutches is a constant size. However, when the air gap varies due to the state of wear of frictional engagement members of the electromagnetic clutch and the variation in the position of the armature when the electromagnetic clutch is in a disengaged state, an error is caused in the relationship between the target magnetic flux density and the target excitation current, and a proper target excitation current cannot be calculated, thereby raising the possibility that the control precision might be degraded.

The present applicant proposed in Japanese Patent Application No. 2000-219055 that degradation in the responsiveness of engagement of an electromagnetic clutch could be prevented by calculating a delayed target magnetic flux density from a target magnetic flux density of the electromagnetic clutch while taking into consideration a delay factor in the control system; calculating a deviation between the percentage change in the delayed target magnetic flux density obtained by differentiating the delayed target magnetic flux density with respect to time and the percentage change in the actual magnetic flux density of the electromagnetic clutch; and compensating, based on the deviation, for an error in the target excitation current caused, by external perturbations such as a widened air gap of the armature, at the instant the coil is excited.

However, since the arrangement proposed in Japanese Patent Application No. 2000-219055 requires means for calculating the percentage change in the actual magnetic flux density, means for calculating the delay factor, differentiating means, means for calculating the deviation, means for gain multiplying, etc., there is the problem that the structure of the control system becomes complicated.

SUMMARY OF THE INVENTION

The present invention has been carried out in view of the above-mentioned circumstances, and it is an object of the present invention to allow the engagement force of an electromagnetic clutch to be precisely controlled at a target engagement force by a simple structure even when the air gap of the armature of the electromagnetic clutch varies.

In order to achieve the above-mentioned object, in accordance with the invention, an electromagnetic clutch control system is provided that includes a magnetic flux density sensor for detecting an actual magnetic flux density that flows in an electromagnetic clutch, target engagement force calculating means for calculating a target engagement force of the electromagnetic clutch, target magnetic flux density calculating means for calculating a target magnetic flux density of the electromagnetic clutch based on the target engagement force calculated by the target engagement force calculating means, and feedback control means for feedback control of the current supplied to the electromagnetic clutch so that the actual magnetic flux density agrees with the target magnetic flux density.

In accordance with the above-mentioned arrangement, since the target magnetic flux density of the electromagnetic clutch is calculated based on the target engagement force of the electromagnetic clutch, and the current supplied to the electromagnetic clutch is feedback controlled so that the actual magnetic flux density flowing through the electromagnetic clutch agrees with the target magnetic flux density, even when the air gap varies due to wear, etc. of the frictional engagement members and the relationship between the actual magnetic flux density and the current changes, the engagement force of the electromagnetic clutch can be precisely controlled at the target engagement force.

BRIEF DESCRIPTION OF DRAWINGS

FIGS. 1 to 10 illustrate one embodiment of the present invention.

FIG. 1 is a diagram showing the structure of a driving force distribution system.

FIG. 2 is a diagram showing the action of the driving force distribution system when the vehicle is turning right at a medium to low speed.

FIG. 3 is a diagram showing the action of the driving force distribution system when the vehicle is turning left at a medium to low speed.

FIG. 4 is a magnified view of an essential part in FIG. 1.

FIG. 5 is a cross-sectional view at line 5—5 in FIG. 4.

FIG. 6 is a cross-sectional view at line 6—6 in FIG. 4.

FIG. 9 is a map showing the relationship between the magnetic flux density and the engagement force of the clutch.

FIG. 10 is a block diagram of a control system for an electromagnetic clutch.

DETAILED DESCRIPTION OF THE PREFERRED EMBODIMENT

Figure 1:
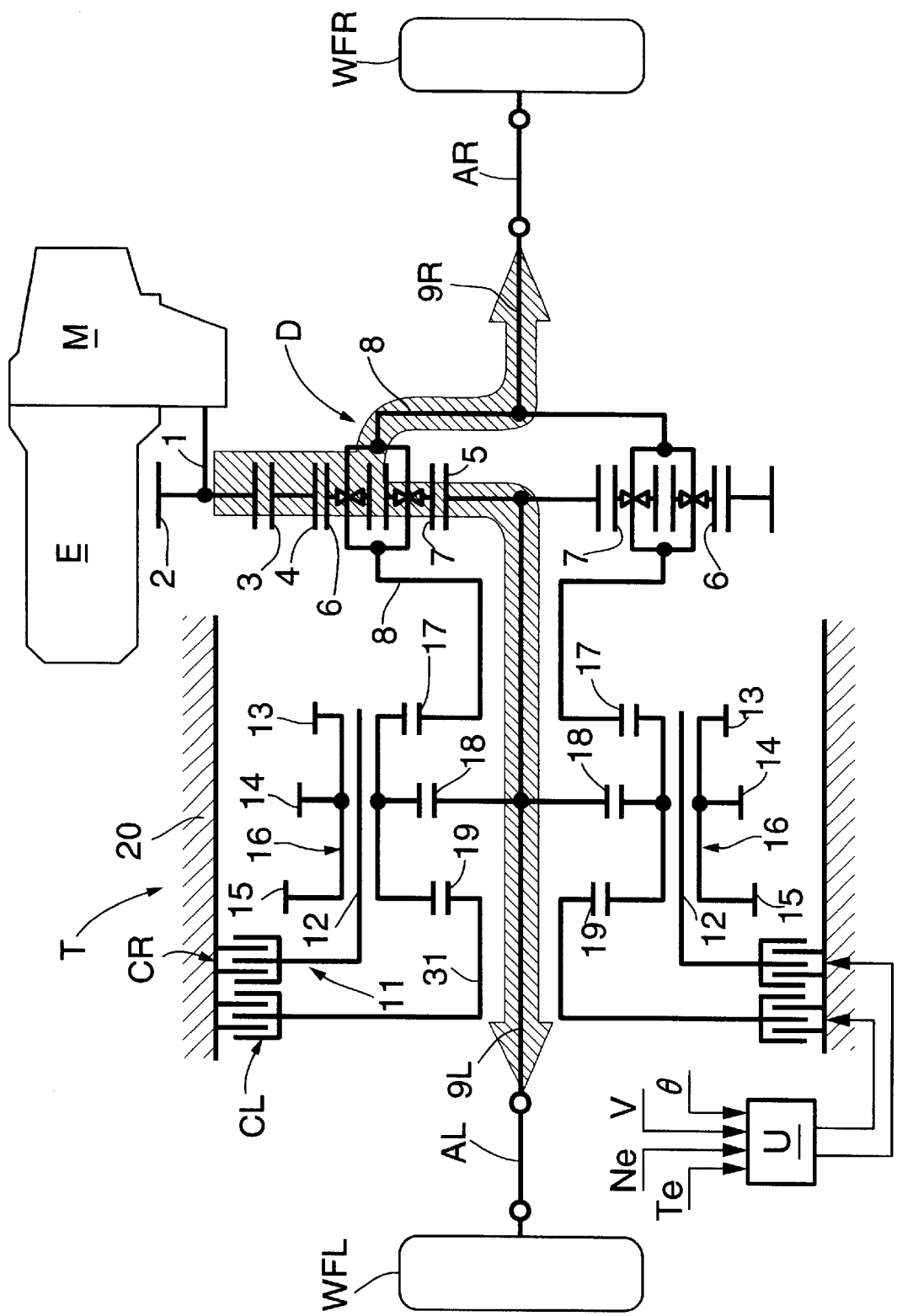

As shown in FIG. 1, a transmission M is connected to the right end of an engine E, which is transversely mounted in the front part of a vehicle body of a front-engine/front-wheel drive vehicle, and a driving force distribution system T is disposed to the rear of engine E and transmission M. A front right wheel WFR and a front left wheel WFL are connected to a right drive shaft AR and a left drive shaft AL respectively which extend laterally from the right end and the left end of the driving force distribution system T.

The driving force distribution system T includes a differential D to which the driving force is transmitted from an externally-toothed gear 3 meshing with an input gear 2 provided on an input shaft 1 extending from the transmission M. The differential D has a double pinion type planetary gear mechanism and includes a ring gear 4; a sun gear 5; and a planetary carrier 8 supporting an outer planetary gear 6 and an inner planetary gear 7 in a state in which the gears are meshed with each other. The ring gear 4 is integrally formed with the externally-toothed gear 3. The sun gear 5 is provided coaxially within the ring gear 4. The outer planetary gear 6 meshes with the ring gear 4. The inner planetary gear 7 meshes with the sun gear 5. In the differential D, the ring gear 4 functions as an input element while the sun gear 5, which functions as one of the output elements, is connected to the front left wheel WFL via a left output shaft 9L. The planetary carrier 8, which functions as the other of the output elements, is connected to the front right wheel WFR via a right output shaft 9R.

A carrier member 11 rotatably supported on the outer circumference of the left output shaft 9L is provided with four pinion shafts 12 disposed at 90° intervals in the circumferential direction, and each pinion shaft 12 rotatably supports a triple pinion member 16 in which a first pinion 13, a second pinion 14 and a third pinion 15 are integrally formed.

Rotatably supported on the outer circumference of the left output shaft 9L is a first sun gear 17 that meshes with the first pinion 13 and is linked to the planetary carrier 8 of the differential D. A second sun gear 18 fixed on the outer circumference of the left output shaft 9L meshes with the second pinion 14. Furthermore, a third sun gear 19 rotatably supported on the outer circumference of the left output shaft 9L meshes with the third pinion 15.

As an example, the numbers of teeth on the first pinion 13, the second pinion 14, the third pinion 15, the first sun gear 17, the second sun gear 18 and the third sun gear 19 in the embodiment are as follows.

| | |
|---|---|
| Number of teeth on the first pinion 13 | Zb = 17 |
| Number of teeth on the second pinion 14 | Zd = 17 |
| Number of teeth on the third pinion 15 | Zf = 34 |
| Number of teeth on the first sun gear 17 | Za = 32 |
| Number of teeth on the second sun gear 18 | Zc = 28 |
| Number of teeth on the third sun gear 19 | Ze = 32 |

The third sun gear 19 can be connected to a housing 20 via a left electromagnetic clutch CL, and the rotational speed of the carrier member 11 is increased by engagement of the left electromagnetic clutch CL. The carrier member 11 can be connected to the housing 20 via a right electromagnetic clutch CR, and the rotational speed of the carrier member 11 is reduced by engagement of the right electromagnetic clutch CR. The right electromagnetic clutch CR and left electromagnetic clutch CL are controlled by an electronic control unit U that includes a microcomputer.

The electronic control unit U processes the engine torque Te, the engine rotational speed Ne, the vehicle speed V, and the steering angle θ based on a predetermined program, thereby controlling the right electromagnetic clutch CR and left electromagnetic clutch CL.

Figure 2:
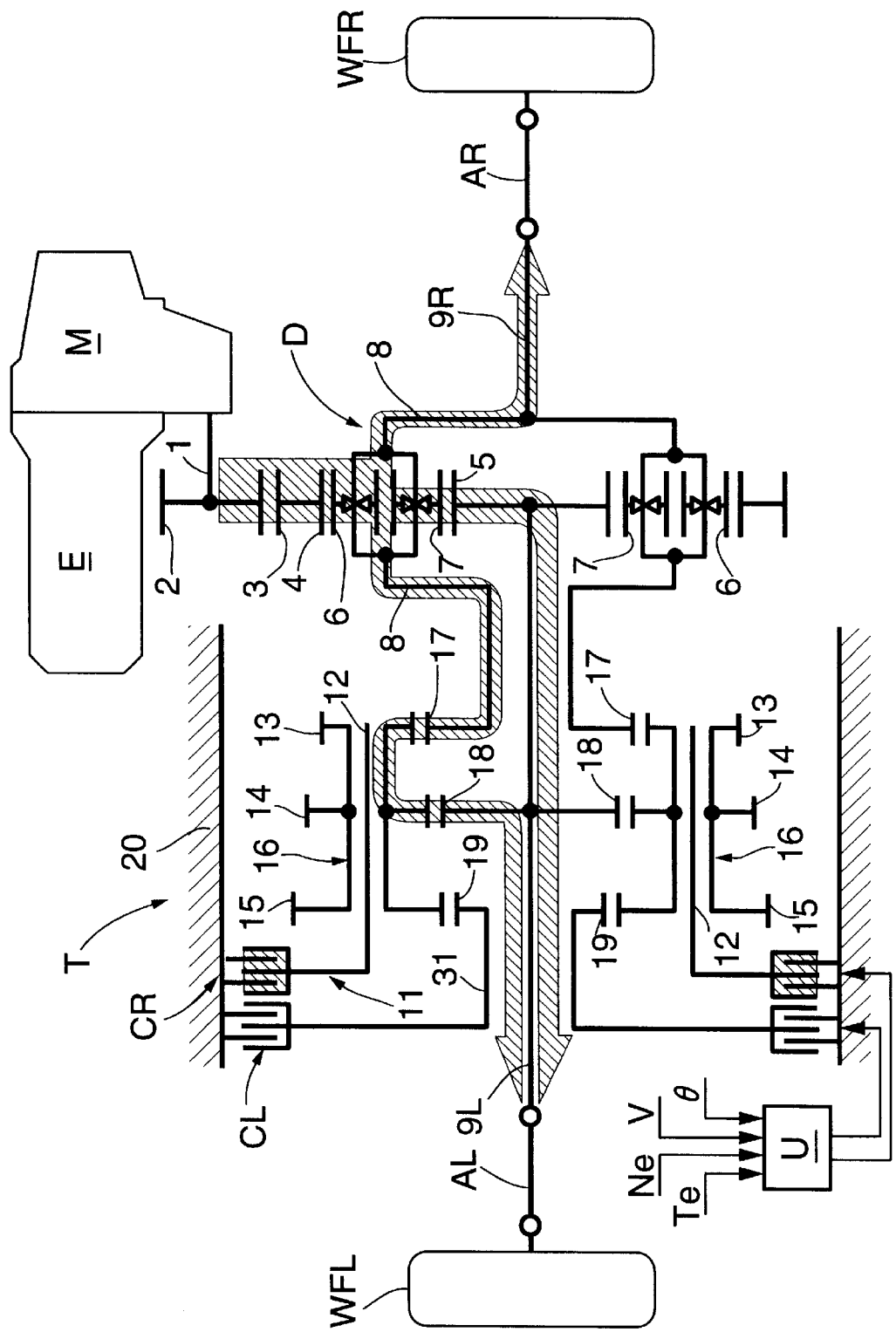

When the vehicle is turning right at a medium to low speed, as shown in FIG. 2, the right electromagnetic clutch CR is engaged in accordance with a command from the electronic control unit U, thereby connecting the carrier member 11 to the housing 20 and stopping it. At this time, since the left output shaft 9L which is integral with the front left wheel WFL, and the right output shaft 9R which is integral with the front right wheel WFR, (that is, the planetary carrier 8 of the differential D) are linked via the second sun gear 18, the second pinion 14, the first pinion 13 and the first sun gear 17, the rotational speed NL of the front left wheel WFL is increased relative to the rotational speed NR of the front right wheel WFR according to the relationship shown in the equation below.

$$NL/NR = (Zd/Zc) \times (Za/Zb) = 1.143 \qquad (1)$$

When the rotational speed NL of the front left wheel WFL is increased relative to the rotational speed NR of the front right wheel WFR, a proportion of the torque of the front right wheel WFR which is the inner turning wheel, can be transmitted to the front left wheel WFL which is the outer turning wheel, as shown by the hatched arrows in FIG. 2.

If, instead of stopping the carrier member 11 by means of the right electromagnetic clutch CR, the rotational speed of the carrier member 11 is reduced by appropriately adjusting the engagement force of the right electromagnetic clutch CR, the rotational speed NL of the front left wheel WFL can be increased relative to the rotational speed NR of the front right wheel WFR in accordance with the reduction, and any required level of torque can be transmitted from the front right wheel WFR which is the inner turning wheel, to the front left wheel WFL which is the outer turning wheel.

Figure 3:
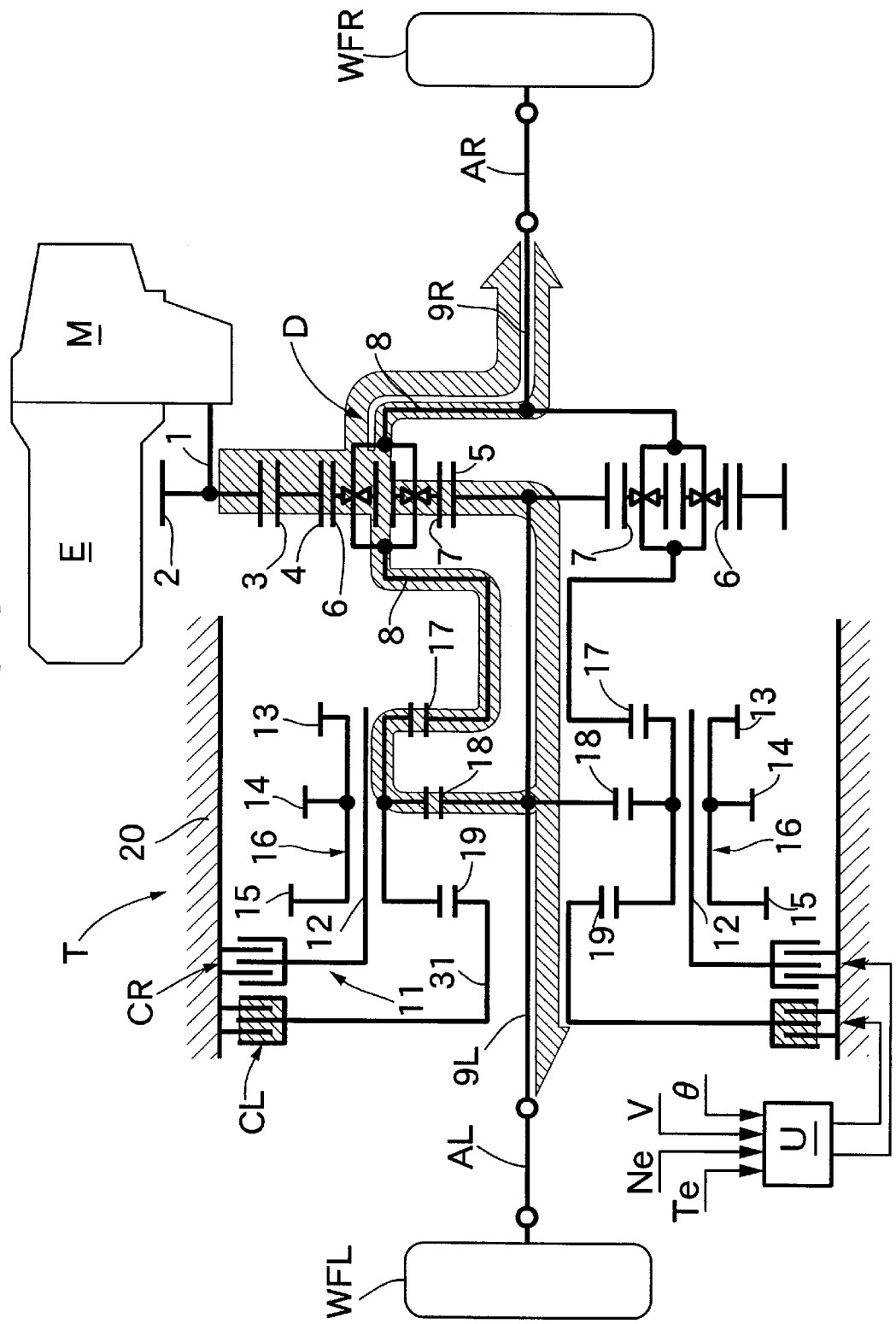

When the vehicle is turning left at a medium to low speed, as shown in FIG. 3 the left electromagnetic clutch CL is engaged in accordance with a command from the electronic control unit U and the third pinion 15 is connected to the housing 20 via the third sun gear 19. As a result, the rotational speed of the carrier member 11 increases relative to the rotational speed of the left output shaft 9L, and the rotational speed NR of the front right wheel WFR is increased relative to the rotational speed NL of the front left wheel WFL in accordance with the relationship shown in the equation below.

$$NR/NL = \{1-(Ze/Zf) \times (Zb/Za)\} \div \{1-(Ze/Zf) \times (Zd/Zc)\} = 1.167 \qquad (2)$$

As described above, when the rotational speed NR of the front right wheel WFR increases relative to the rotational speed NL of the front left wheel WFL, a proportion of the torque of the front left wheel WFL which is the inner turning wheel, can be transmitted to the front right wheel WFR which is the outer turning wheel, as shown by the hatched arrows in FIG. 3. In this case also, if the rotational speed of the carrier member 11 is increased by appropriately adjusting the engagement force of the left electromagnetic clutch CL, the rotational speed NR of the front right wheel WFR can be increased relative to the rotational speed NL of the front left wheel WFL in accordance with the increase, and any required level of torque can be transmitted from the front left wheel WFL which is the inner turning wheel, to the front right wheel WFR which is the outer turning wheel. It is thus possible to enhance the turning performance by transmitting a larger torque to the outer turning wheel than to the inner turning wheel at times when the vehicle is traveling at a medium to low speed. In addition, when the vehicle is traveling at a high speed, it is possible to enhance the stability of travel by lessening the torque transmitted to the outer turning wheel compared with the above-mentioned case of a medium to low speed or alternatively by transmitting torque from the outer turning wheel to the inner turning wheel.

As is clear from a comparison of equation (1) with equation (2), since the number of teeth of the first pinion 13, the second pinion 14, the third pinion 15, the first sun gear 17, the second sun gear 18, and the third sun gear 19 are set, the percentage increase in rotational speed (about 1.143) of the front left wheel WFL over the front right wheel WFR can be made substantially equal to the percentage increase in rotational speed (about 1.167) of the front right wheel WFR over the front left wheel WFL.

Figure 4:
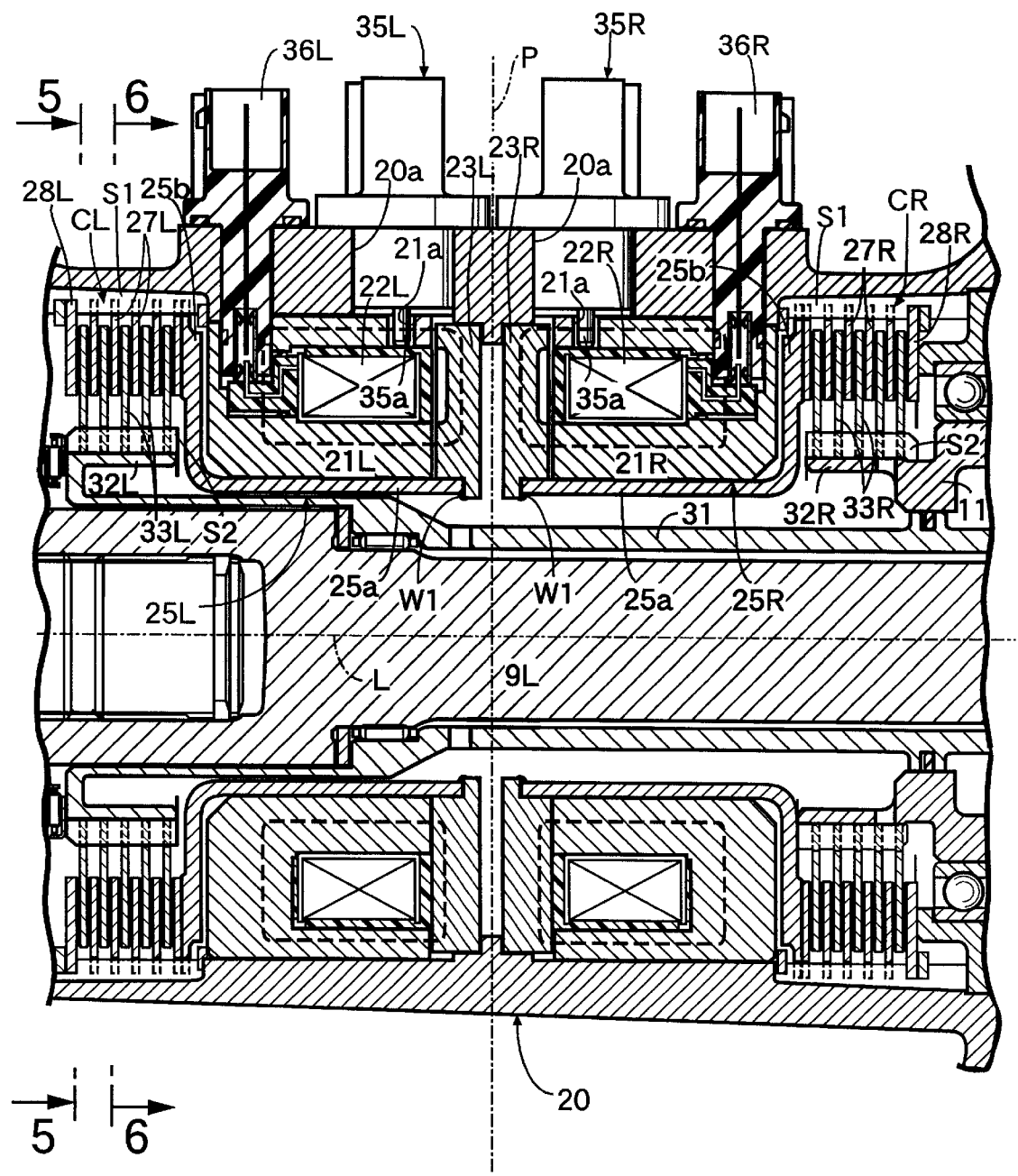
Figure 5:
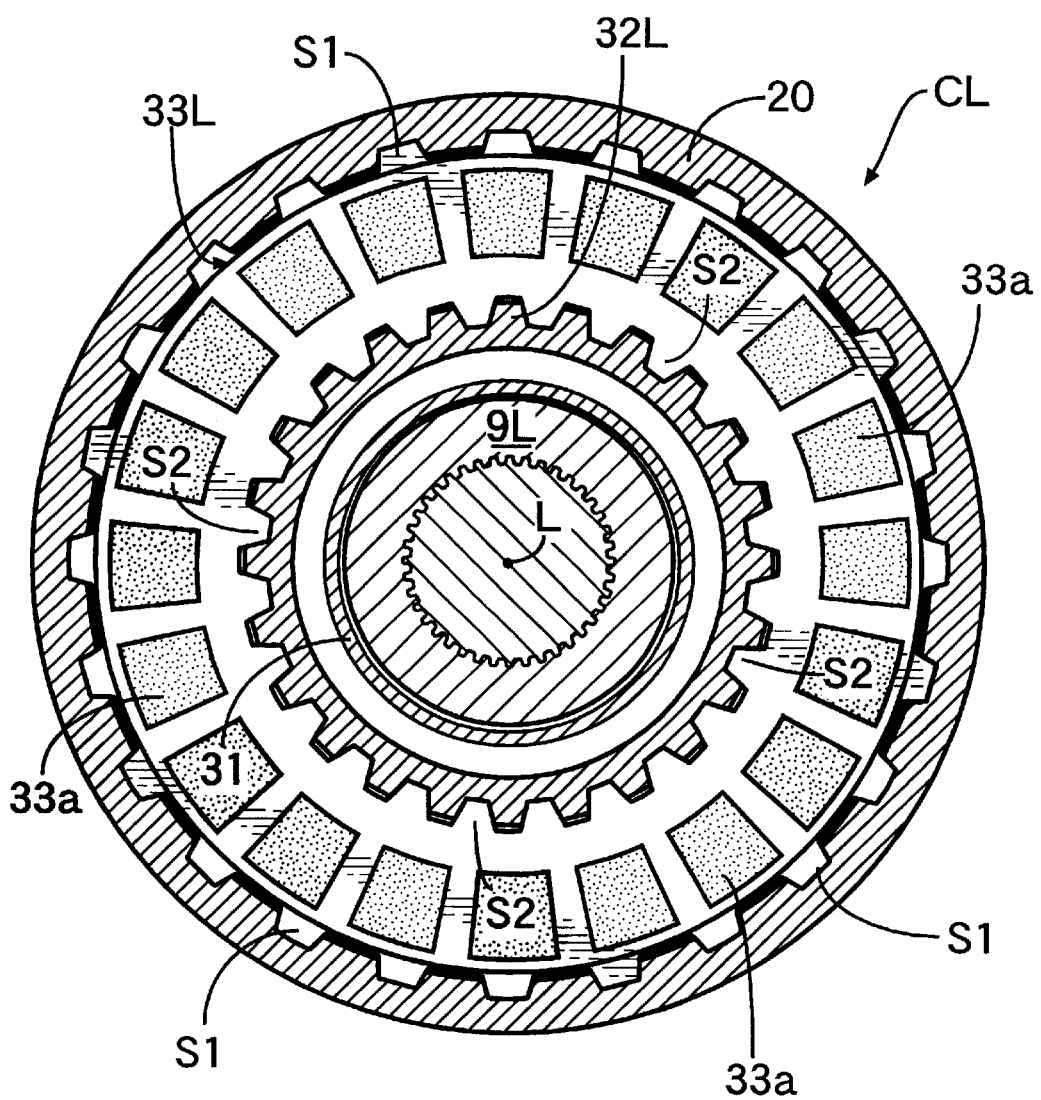
Figure 6:
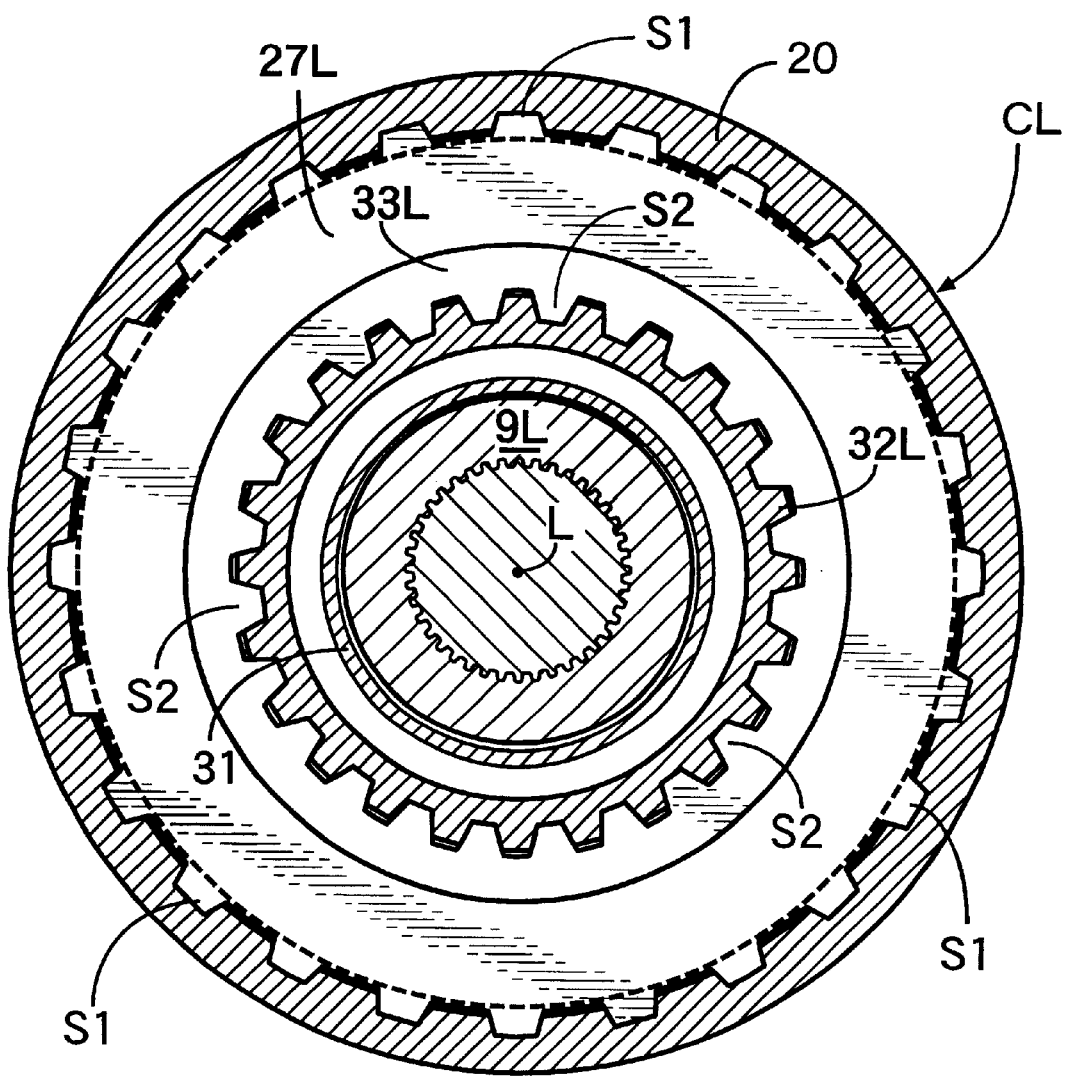

Next, the structure of the right and left electromagnetic clutches CR and CL is explained based on FIG. 4 to FIG. 6. Since the right and left electromagnetic clutches CR and CL have substantially symmetrical structures relative to a plane of symmetry P that is orthogonal to the axis L of the right and left output shafts 9R and 9L, the structure of the left electromagnetic clutch CL is explained as being representative. The reference symbols of components forming the right electromagnetic clutch CR are denoted by 'R', the 'L' of the reference symbols denotes components forming the left electromagnetic clutch CL.

The left electromagnetic clutch CL housed within the housing 20 made of a non-magnetic material such as an aluminum alloy is provided with a core 21L made of a magnetic material in a substantially cylindrical form. The core 21L is fixed to the inner circumference of the housing 20 so that it can neither rotate nor move in the axial direction (lateral direction). A coil 22L is housed within the core 21L. Disposed in a laterally movable manner to directly face the right end face of the coil 22L is an armature 23L made of a magnetic material in an annular form. Fitted coaxially around the outer circumference of the left output shaft 9L in a relatively rotatable manner, is a sleeve 31 that is integral with the third sun gear 19 (see FIG. 1). Disposed between the outer circumference of the sleeve 31 and the inner circumference of the core 21L in an axially movable manner, is a cylindrical part 25a of a transmission member 25L fixed on the inner circumference of the armature 23L by a weld W1.

A pressure plate 25b, five clutch plates 27L, and one stopper plate 28L are coupled to spline S1 on the inner circumference of the housing 20 so that they cannot rotate but can move axially, the pressure plate 25b being formed integrally with the transmission member 25L. The left side face of the pressure plate 25b of the transmission member 25L faces the right side face of the clutch plate 27L on the rightmost end so that they can make contact. Five clutch discs 33L are coupled to spline S2 on the outer circumference of a guide part 32L so that they cannot rotate but can move axially, the guide part 32L being provided integrally with the left end of the sleeve 31. The five clutch discs 33L and the five clutch plates 27L are alternately superimposed on each other with respect to the one stopper plate 28L.

As is clear from FIG. 5, the five clutch discs 33L coupled to spline S2 on the outer circumference of the guide part 32L that is integral with the sleeve 31, are provided with a large number of facings 33a affixed to both sides of the clutch discs 33L and aligned in the circumferential direction. As seen from FIG. 6 the five clutch plates 27L coupled to spline S1 on the inner circumference of the housing 20 are each formed from a metal plate having no facing and can make direct contact with the facings 33a of the clutch discs 33L.

The right electromagnetic clutch CR has a structure that is symmetrical with that of the left electromagnetic clutch CL relative to the plane of symmetry P except that, whereas the guide part 32L of the left electromagnetic clutch CL is provided integrally with the sleeve 31 which is integral with the third sun gear 19, the guide part 32R of the right electromagnetic clutch CR is provided integrally with the carrier member 11.

A magnetic flux density sensor 35L is fitted from the outside and fixed in a magnetic flux density sensor mounting hole 20a running through the housing 20. Provided on the extremity of the magnetic flux density sensor 35L is a detecting part 35a within which a Hall probe is housed. The detecting part 35a is fitted within a recess 21a formed in the core 21L. A connector 36L for feeding current to the coil 22L is provided on the housing 20 at a position adjacent to the magnetic flux density sensor 35L.

When current is fed to the coil 22L in accordance with a command from the electronic control unit U to engage the left electromagnetic clutch CL, a magnetic flux is generated along a closed magnetic path running through the core 21L and the armature 23L which are made of a magnetic material, as shown by the broken line in FIG. 4. As a result, the armature 23L is attracted leftward in the figure toward the coil 22L. At the same time, the transmission member 25L connected to the armature 23L moves leftward, thereby camping the clutch plates 27L and the clutch discs 33L between the stopper plate 28L and the pressure plate 25b of the transmission member 25L. As a result, the clutch plates 27L coupled to spline S1 on the housing 20 and the clutch discs 33L coupled to spline S2 on the guide part 32L are united, thereby connecting the housing 20 to the sleeve 31 supporting the guide part 32L.

In a similar manner, when current is fed to a coil 22R in accordance with a command from the electronic control unit U to engage the right electromagnetic clutch CR, a magnetic flux is generated along a closed magnetic path running through a core 21R and an armature 23R which are made of a magnetic material, as shown by the broken line in FIG. 4. As a result, the armature 23R is attracted to the right in the figure, toward the coil 22R. At the same time, a transmission member 25R connected to the armature 23R moves rightward, thereby camping clutch plates 27R and clutch discs 33R between a stopper plate 28R and a pressure plate 25b of the transmission member 25R. As a result, the clutch plates 27R coupled to spline S1 on the housing 20 and the clutch discs 33R coupled to spline S2 on a guide part 32R are united, thereby connecting the housing 20 to the carrier member 11 supporting the guide part 32R.

Figure 10:
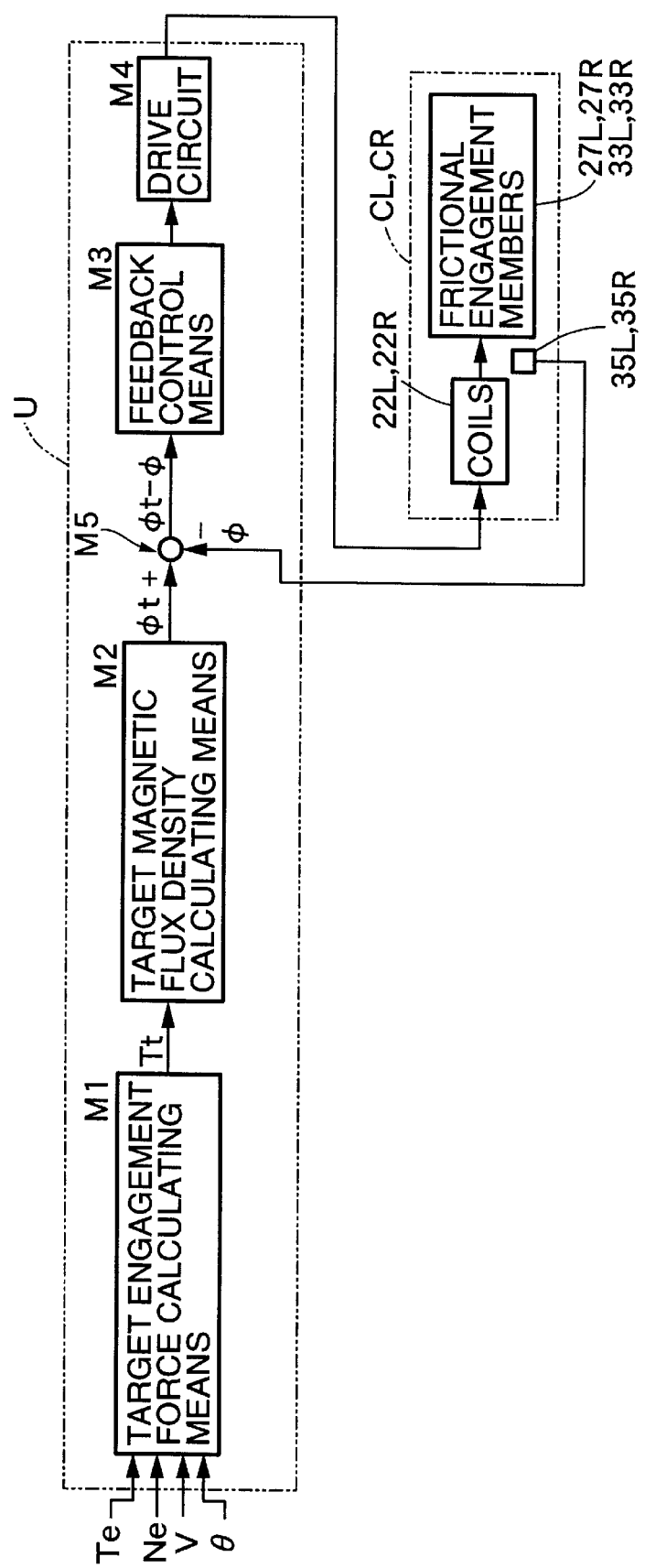

As shown in FIG. 10, the electronic control unit U is provided with target engagement force calculating means M1, target magnetic flux density calculating means M2, feedback control means M3, drive circuit M4, and subtracting means M5.

Figure 9:
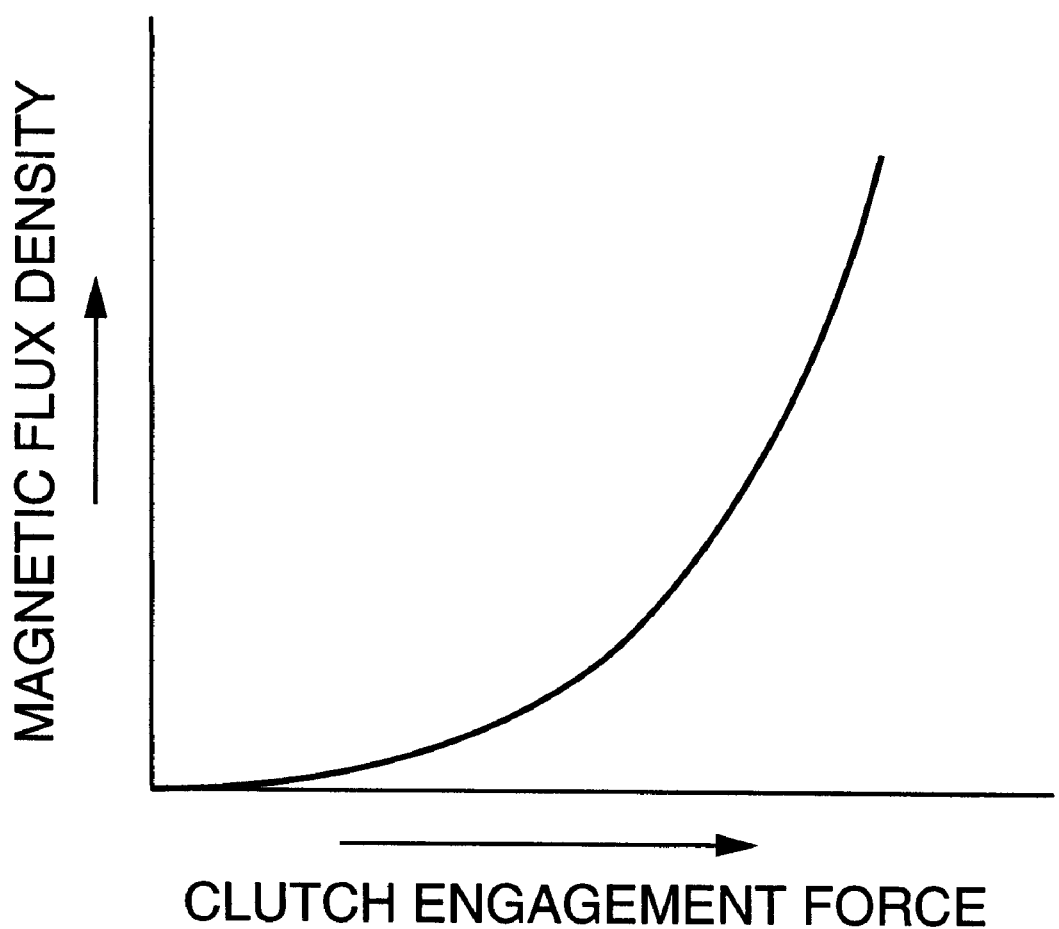

The target engagement force calculating means M1 calculates a target engagement force Tt for the electromagnetic clutches CL and CR in order to distribute predetermined amounts of torque between the right and left driven wheels WFR and WFL, based on the engine torque Te, the engine rotational speed Ne, the vehicle speed V and the degree $\theta$ of throttle opening. Since the magnetic flux density generated by excitation of each of the coils 22R and 22L of the electromagnetic clutches CR and CL and the engagement force generated by the corresponding electromagnetic clutches CR and CL have a certain relationship as shown in the map of FIG. 9, the target magnetic flux density calculating means M2 uses the target engagement force Tt for the electromagnetic clutches CR and CL in the map of FIG. 9, to look up a target magnetic flux density $\phi t$ that is to be generated by each of the coils 22R and 22L and that is the quantity to be controlled.

An actual magnetic flux density 4 generated by excitation of the coils 22R and 22L of the electromagnetic clutches CR and CL is detected by the corresponding magnetic flux density sensors 35R and 35L. The subtracting means M5 subtracts the actual magnetic flux density 4 from the target magnetic flux density $\phi t$ to give a deviation $\phi t-\phi$, which is then input into the feedback control means M3. The feedback control means M3 calculates a target current, which is the quantity that is to be operated, for each of the coils 22R and 22L by PID processing of the deviation $\phi t-\phi$, and the drive circuit M4 excites the coils 22R and 22L based on the target current. As a result, one of the right and left electromagnetic clutches CR and CL is engaged with the target engagement force Tt, thereby distributing predetermined amounts of torque between the right and left front wheels WFR and WFL.

If the target current supplied to the coils 22R and 22L is calculated from the target magnetic flux density $\phi t$, and feedback control is carried out based on the deviation between the target current and the actual current detected by a current sensor, the precision of the control will be degraded for the following reasons. That is, since the air gaps between the cores 21R, 21L and the armatures 23R, 23L change according to the degree of wear of the facings 33a of the clutch discs 33R and 33L, even when the actual current of the coil 22R and 22L is made to agree with the target current, the magnetic flux density decreases when the air gap is large, and the actual engagement force T of the electromagnetic clutches CR and CL thereby becomes less than the target engagement force Tt. When the air gap is small, the magnetic flux density increases, and the actual engagement force T of the electromagnetic clutches CR and CL thereby becomes more than the target engagement force Tt.

In accordance with the preferred embodiment described above, since the current supplied to the coils 22R and 22L is feedback controlled based on the deviation between the target magnetic flux density $\phi t$ and the actual magnetic flux density $\phi$ detected by each of the magnetic flux density sensors 35R and 35L, the actual engagement force T for each of the electromagnetic clutches CR and CL can be made to agree precisely with the target engagement force Tt regardless of the size of the air gap $\alpha$.

Figure 7A:
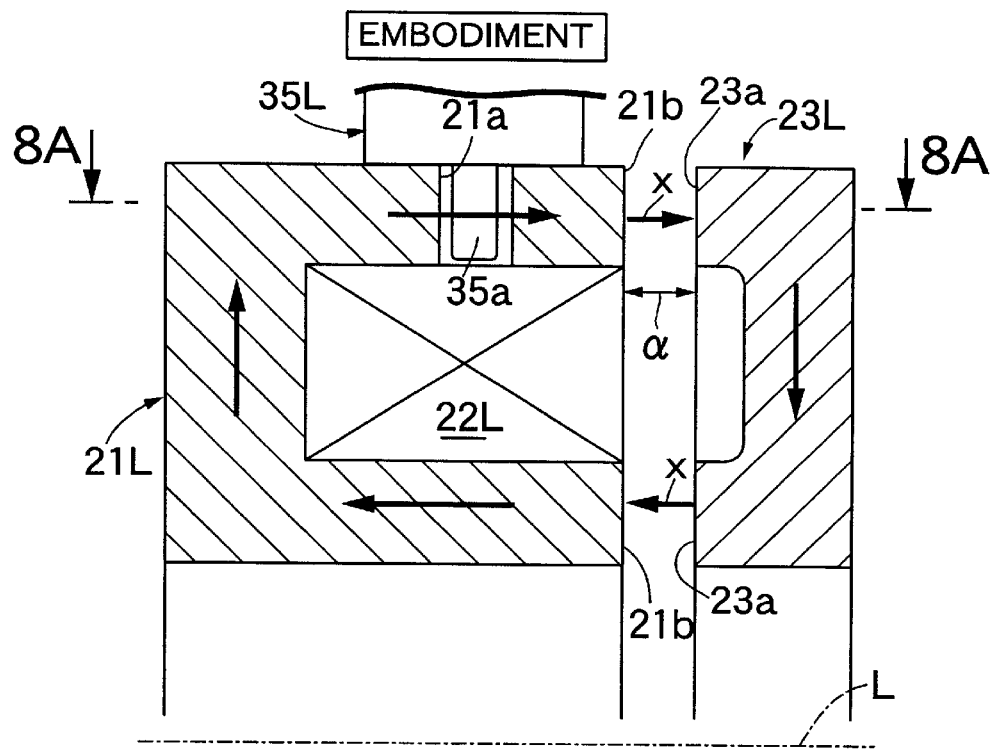
FIGS. 7A and 7B show diagrams for explaining the shape and operation of an armature.
Figure 7B:
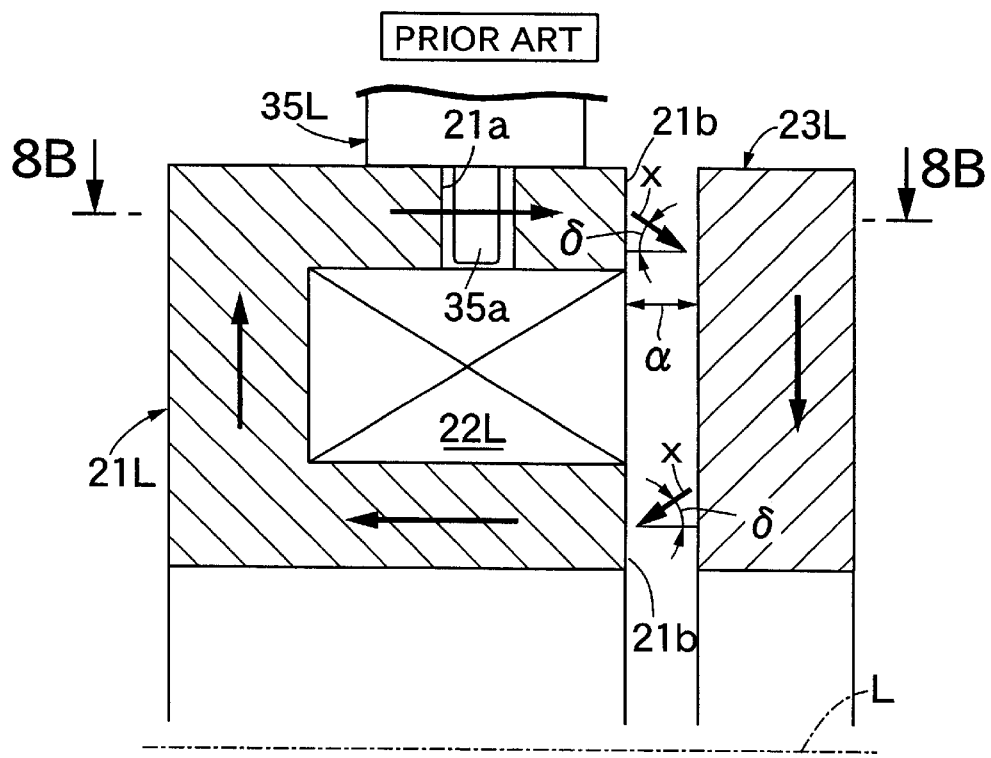

As is clear from FIGS. 4 and 7A, the armatures 23R and 23L of the preferred embodiment have recesses on parts facing the coils 22R and 22L and projections 23a on parts directly opposite attracting faces 21b of the cores 21R and 21L. FIG. 7B illustrates a conventional armature 23L having a fat part opposite the attracting faces 21b of the core 21L and the coil 22L. When a magnetic flux, shown by the arrows, is formed as a result of excitation of the coil 22L, the magnetic flux flows along a path that minimizes the magnetic resistance, thereby causing a phenomenon in which the magnetic flux is inclined as shown by arrows x relative to the direction of the axis L (direction in which the armature 23L moves) in the air gap $\alpha$ area. The smaller the air gap $\alpha$, the larger the angle of inclination $\delta$ of the magnetic flux denoted by x.

Since the attractive force with which the cores 21R and 21L attract the armatures 23R and 23L acts in the direction of the magnetic flux in the air gap $\alpha$, in the case where the direction of the magnetic flux coincides with the direction of the axis L, the entire attractive force is utilized as a driving force for the armatures 23R and 23L. However, when the angle of inclination 8 of the magnetic flux increases, only that component of the attractive force that is parallel to the axis L can be utilized as a driving force for the armatures 23R and 23L, thereby weakening the engagement force of the electromagnetic clutches CR and CL accordingly, resulting in the problem that the precision of control is degraded.

However, in accordance with the preferred embodiment, since the projections 23a (FIG. 7A) are formed on each of the armatures 23R and 23L, the projections 23a facing the attracting faces 21b of each of the cores 21R and 21L through which the magnetic flux passes, the magnetic flux flows in the air gap $\alpha$ in the direction of the axis L without being inclined. Therefore, a precise attractive force in accordance with the actual magnetic flux density $\phi$ can be applied to the armature 23R and 23L, thereby preventing any degradation in the precision of control of the engagement force of the electromagnetic clutches CR and CL.

Figure 8A:
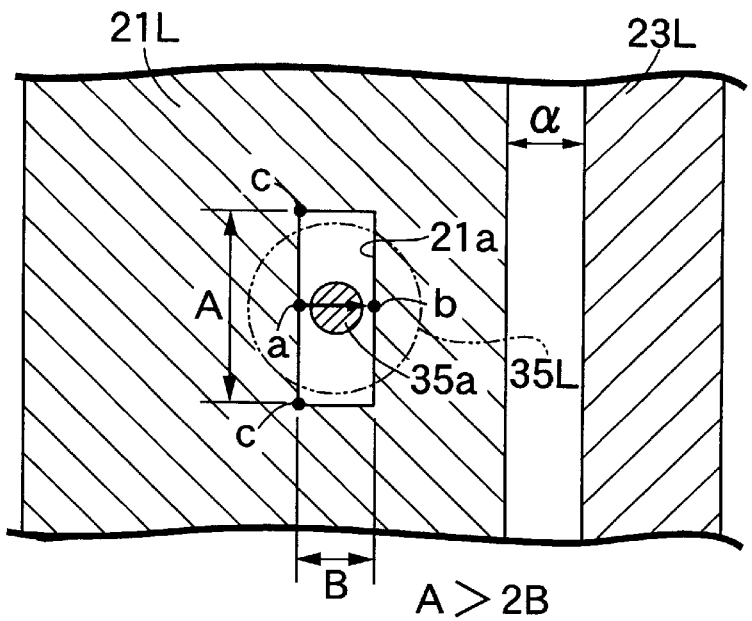
FIG. 8A shows a cross-sectional view at line 8A—8A in FIG. 7A
Figure 8B:
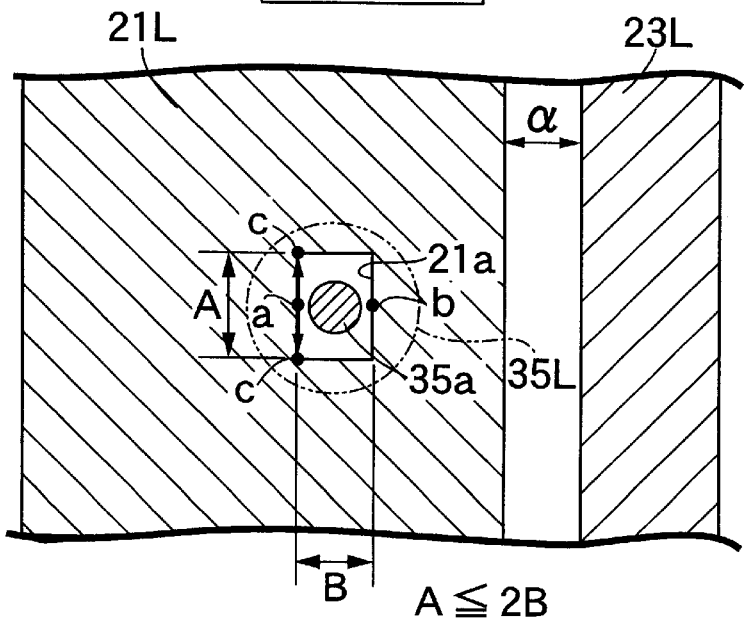
FIG. 8B shows a cross-sectional view at line 8B—8B in FIG. 7B.

As is clear from FIG. 8A, a recess 21a formed in each of the cores 21R and 21L has a rectangular shape having a width A in the lateral direction (circumferential direction) and a width B in the longitudinal direction (axis L direction). The detecting part 35a of each of the magnetic sensors 35R and 35L is inserted into the center of the recess 21a. The width A in the lateral direction and the width B in the longitudinal direction of the recess 21a are set to satisfy the relationship A>2B. In order to precisely detect the magnetic flux density by using the magnetic flux density sensors 35R and 35L, it is necessary that the magnetic flux density in each part of the cores 21R and 21L coincides with the magnetic flux density in the recess 21a. If, as shown in FIG. 8B, the recess 21a has a shape satisfying the relationship A≦2B, since the distance A/2 between a point a and a point c that is spaced from point a in the lateral direction becomes smaller than the distance B between point a and a point b that is spaced from point a in the longitudinal direction, the magnetic flux flows more easily in the lateral direction from point a to point c, and the magnetic flux density passing through the detecting part 35a of the magnetic flux density sensors 35R and 35L decreases, thereby degrading the precision of detection.

When, as shown in FIG. 8A, the recess 21a has a shape that satisfies the relationship A>2B, since the distance B between a point a and a point b that is spaced from point a in the longitudinal direction is smaller than the distance A/2 between point a and a point c that is spaced from point a in the lateral direction, the magnetic flux flows more easily in the longitudinal direction from point a to point b, and the great majority of the magnetic flux in the recess 21a passes through the detecting part 35a of the magnetic flux density sensors 35R and 35L, thereby enhancing the precision of detection.

The preferred embodiment illustrates use of the electromagnetic clutches CR and CL for the driving force distribution system T, but the present invention can also be applied to an electromagnetic clutch used for any other purpose. Furthermore, in the preferred embodiment, a sensor that detects magnetic flux leakage is illustrated as an example of the magnetic flux density sensors 35R and 35L, but magnetic flux density sensors 35R and 35L of another type can also be used.

As described above, since the target magnetic flux density of the electromagnetic clutch is calculated based on the target engagement force of the electromagnetic clutch, and the current supplied to the electromagnetic clutch is feedback controlled so that the actual magnetic flux density flowing through the electromagnetic clutch agrees with the target magnetic flux density, even when the air gap varies due to wear, etc. of the frictional engagement members and the relationship between the actual magnetic flux density and the current changes, the engagement force of the electromagnetic clutch can be precisely controlled at the target engagement force.

The present invention may be embodied in other specific forms without departing from the spirit or essential characteristics thereof. The presently disclosed embodiments are therefore to be considered in a respects as illustrative and not restrictive, the scope of the invention being indicated by the appended claims, rather than the foregoing description, and a changes which come within the meaning and range of equivalency of the claims are, therefore, to be embraced therein.

What is claimed is:

1. An electromagnetic clutch control system comprising:

a magnetic flux density sensor for detecting an actual magnetic flux density ($\phi$) that flows in an electromagnetic clutch;

target engagement force calculating means for calculating a target engagement force (Tt) of the electromagnetic clutch;

target magnetic flux density calculating means for calculating a target magnetic flux density ($\phi$t) of the electromagnetic clutch based upon the target engagement force (Tt) calculated by the target engagement force calculating means; and feedback control means for feedback control of the current supplied to the electromagnetic clutch such that the actual magnetic flux density ($\phi$) agrees with the target magnetic flux density ($\phi$t).

2. An electromagnetic clutch and clutch control system therefor, the electromagnetic clutch including an armature, a core and an electromagnetic coil, the armature having a recess formed therein and projections adjacent to the recess extending therefrom, said clutch control system comprising:

a magnetic flux density sensor for detecting an actual magnetic flux density ($\phi$) that flows in the electromagnetic clutch;

target engagement force calculating means for calculating a target engagement force (Tt) of the electromagnetic clutch;

target magnetic flux density calculating means for calculating a target magnetic flux density ($\phi$t) of the electromagnetic clutch based upon the target engagement force (Tt) calculated by the target engagement force calculating means; and feedback control means for feedback control of the current supplied to the electromagnetic clutch such that the actual magnetic flux density ($\phi$) agrees with the target magnetic flux density ($\phi$t).

3. An electromagnetic clutch and clutch control system as set forth in claim 2, wherein the core has a recess into which a detecting part of the magnetic flux density sensor is inserted, the dimension in the lateral direction of the recess being greater than twice the dimension in the longitudinal direction of the recess.

* * * * *